Figure 1:
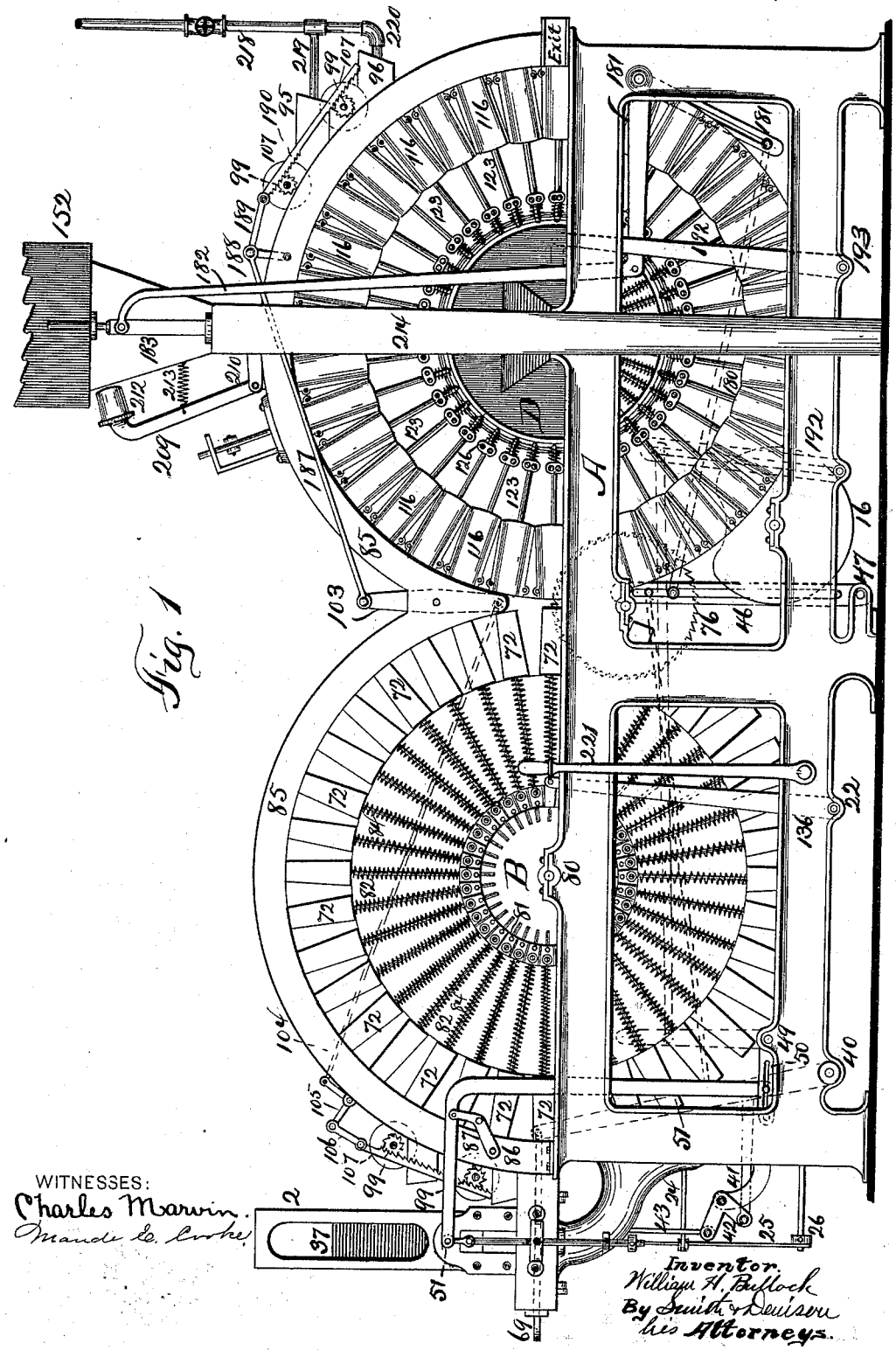

(No Model.) 12 Sheets—Sheet 1.

W. H. BULLOCK.
PACKING MACHINE.

No. 584,850. Patented June 22, 1897.

WITNESSES:
Charles Marvin.
Maude E. Cooke.

Inventor.
William H. Bullock
By Smith & Denison
his Attorneys.

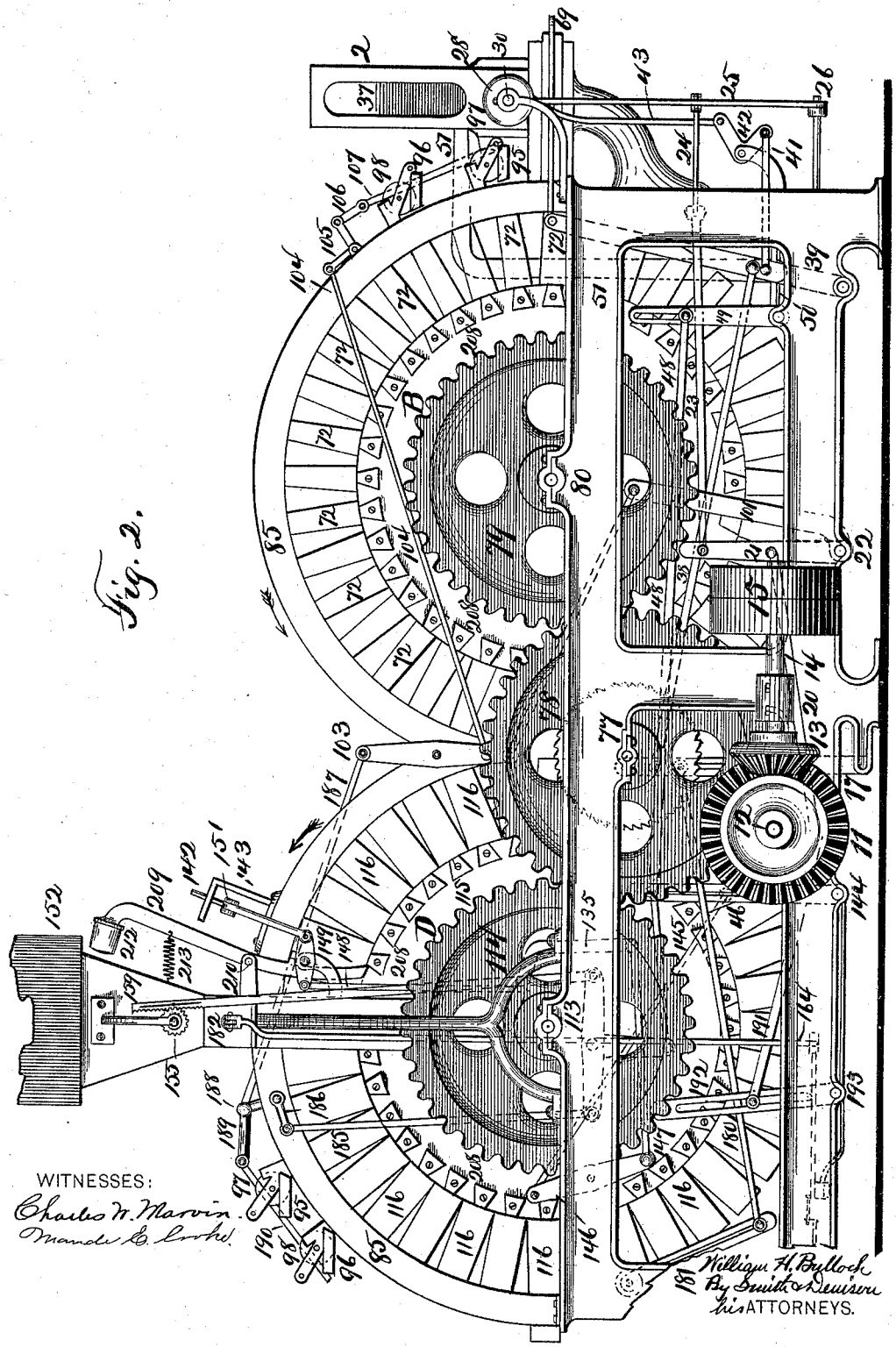

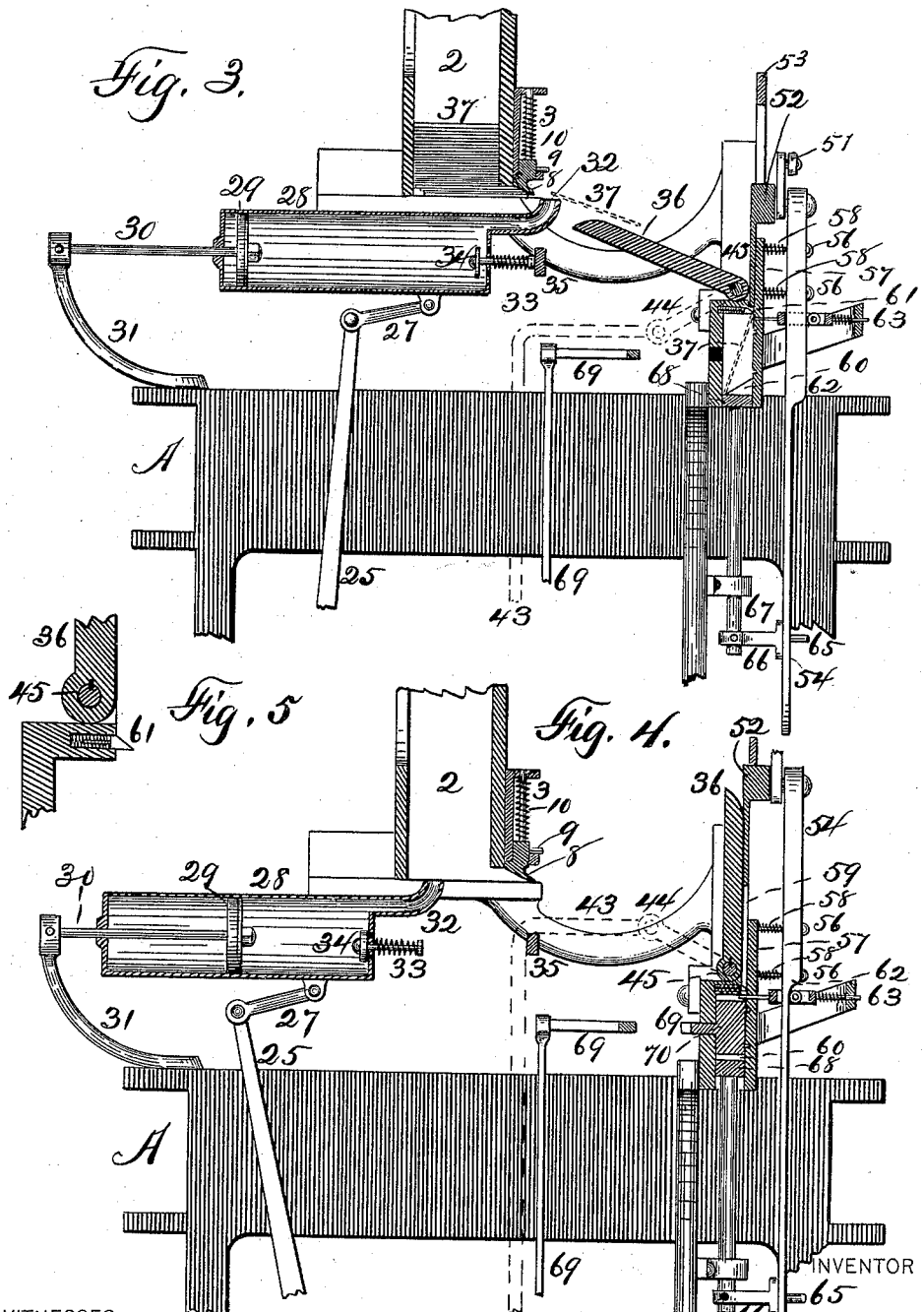

(No Model.)  W. H. BULLOCK.  12 Sheets—Sheet 4.
PACKING MACHINE.
No. 584,850. Patented June 22, 1897.
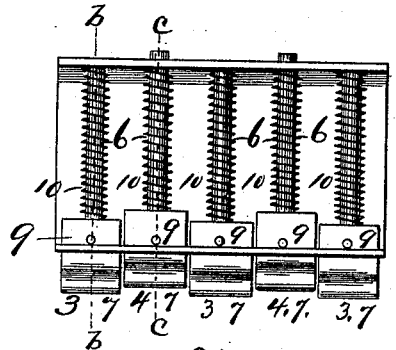
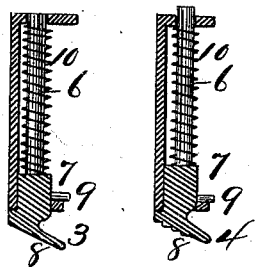
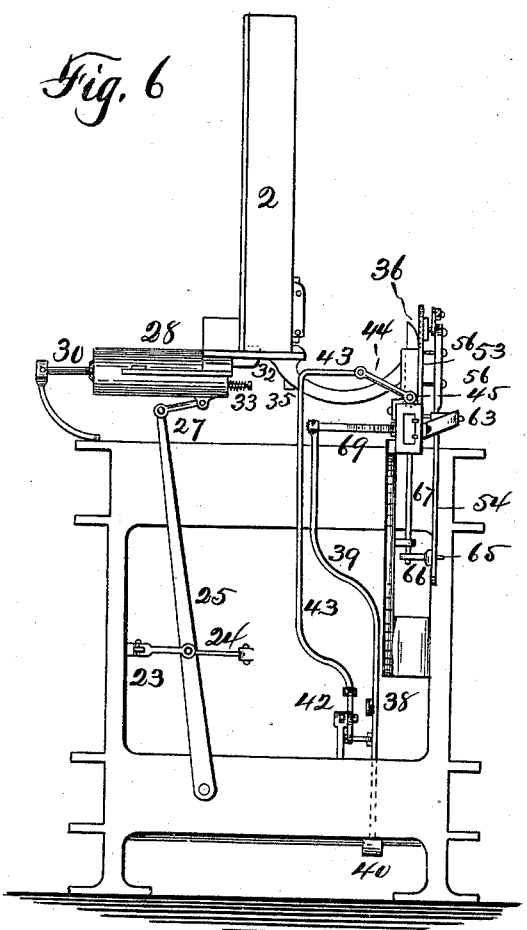
WITNESSES:
Charles W. Marvin.
Maude E. Cooke.
INVENTOR
William H. Bullock
BY
Smith & Denison
his ATTORNEYS.

(No Model.)   12 Sheets—Sheet 5.

W. H. BULLOCK.
PACKING MACHINE.

No. 584,850.   Patented June 22, 1897.

WITNESSES:   INVENTOR
   William H Bullock
   BY
   Smith & Denison
   his ATTORNEYS.

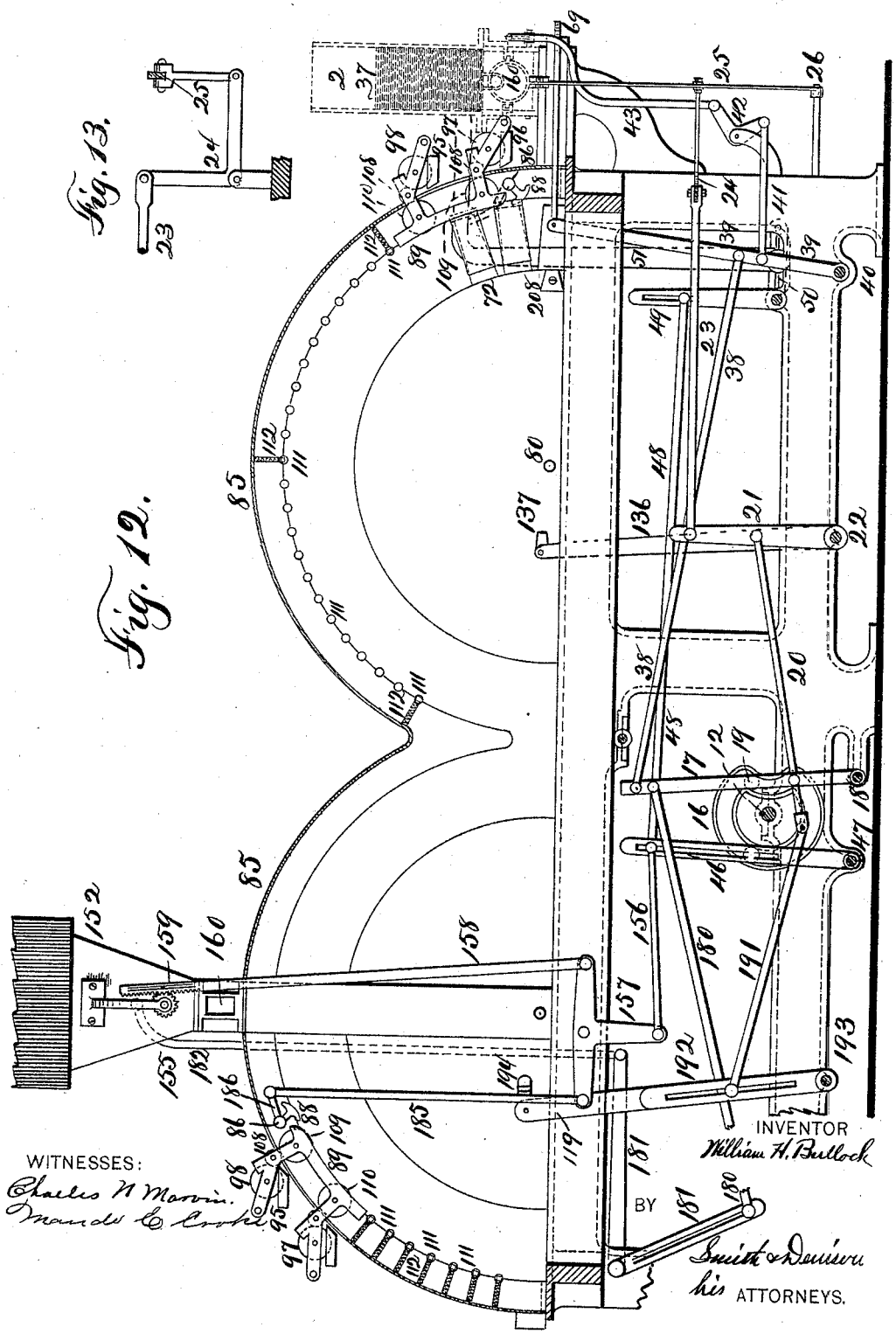

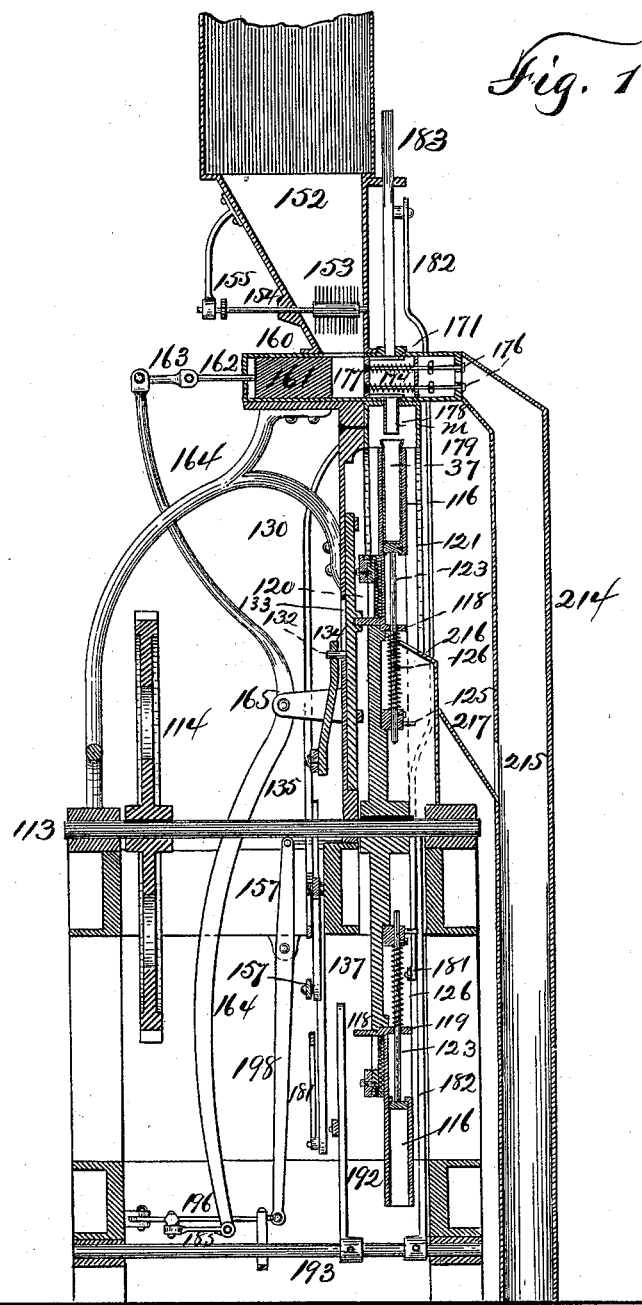

(No Model.) 12 Sheets—Sheet 8.
W. H. BULLOCK.
PACKING MACHINE.
No. 584,850. Patented June 22, 1897.
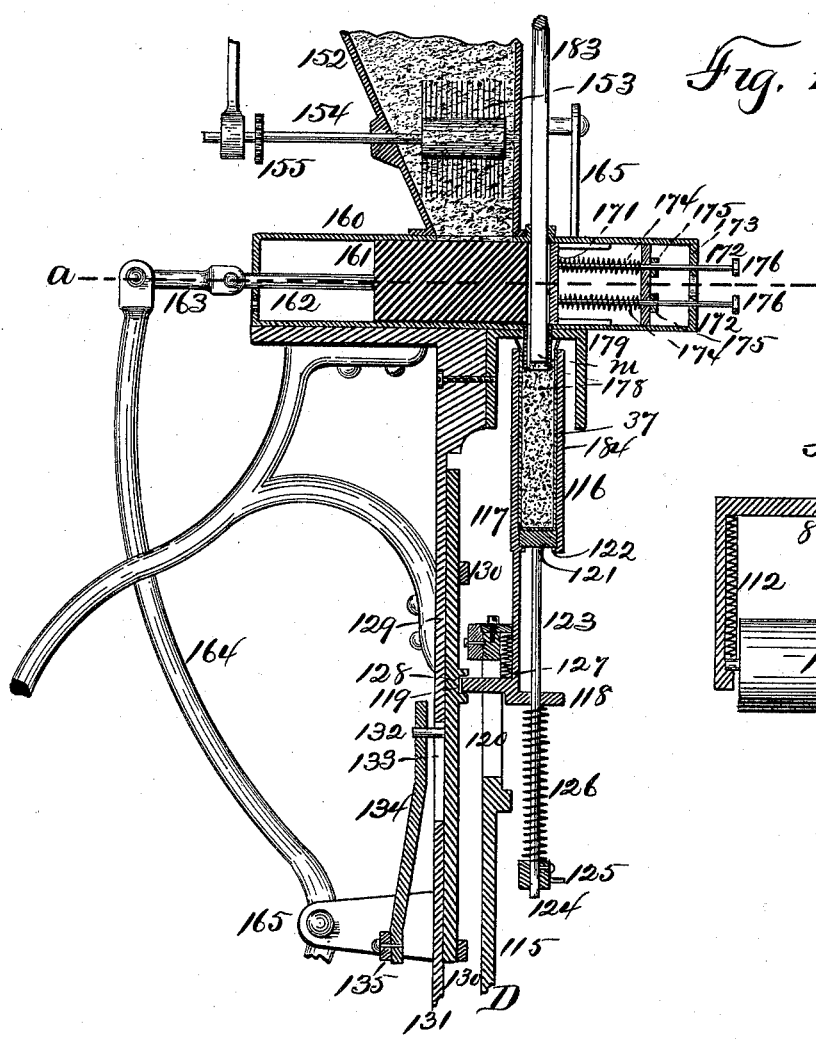
WITNESSES:
Charles N. Marvin
Maude C. Cooke
INVENTOR
William H. Bullock
BY
Smith & Denison
his ATTORNEYS.

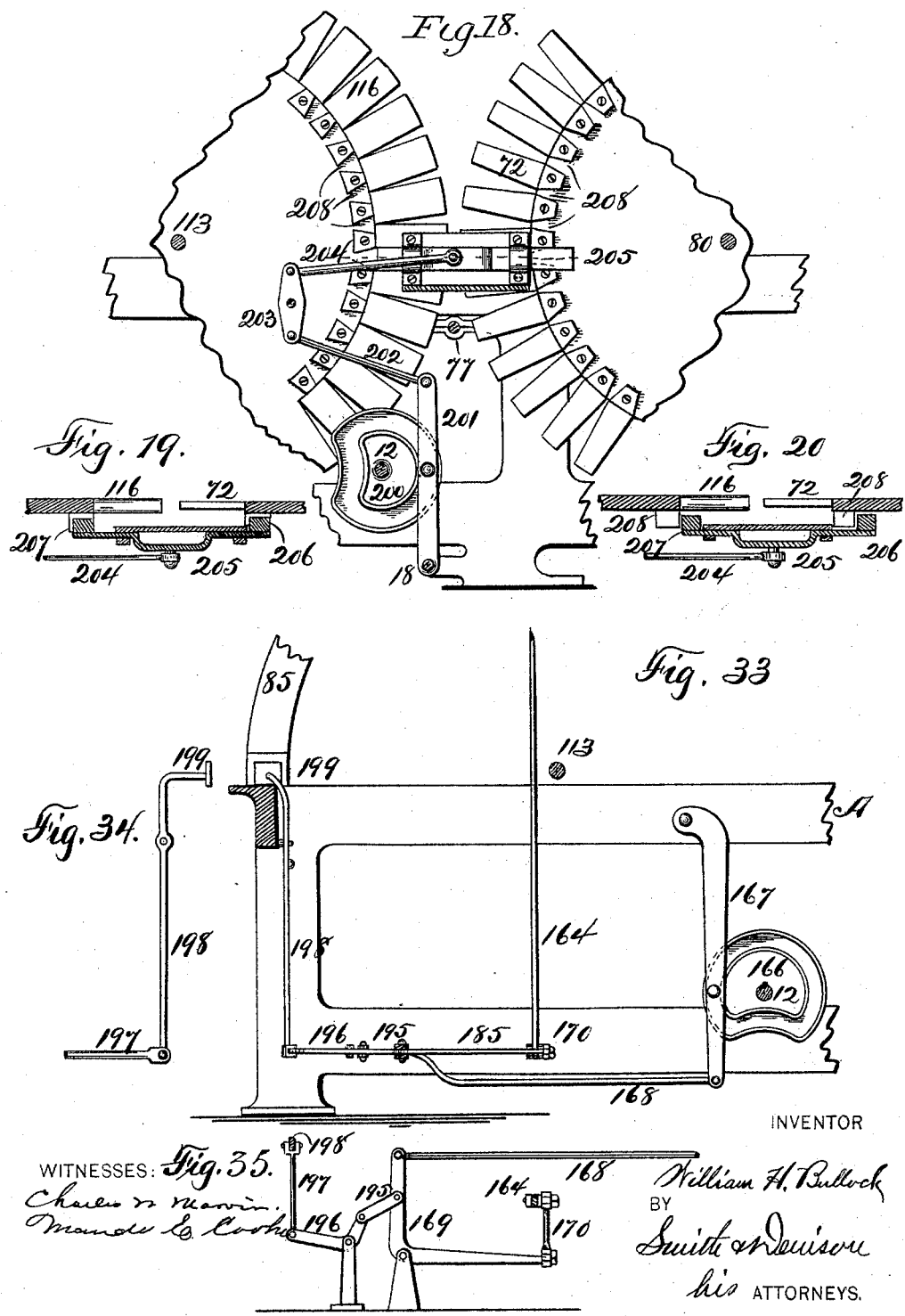

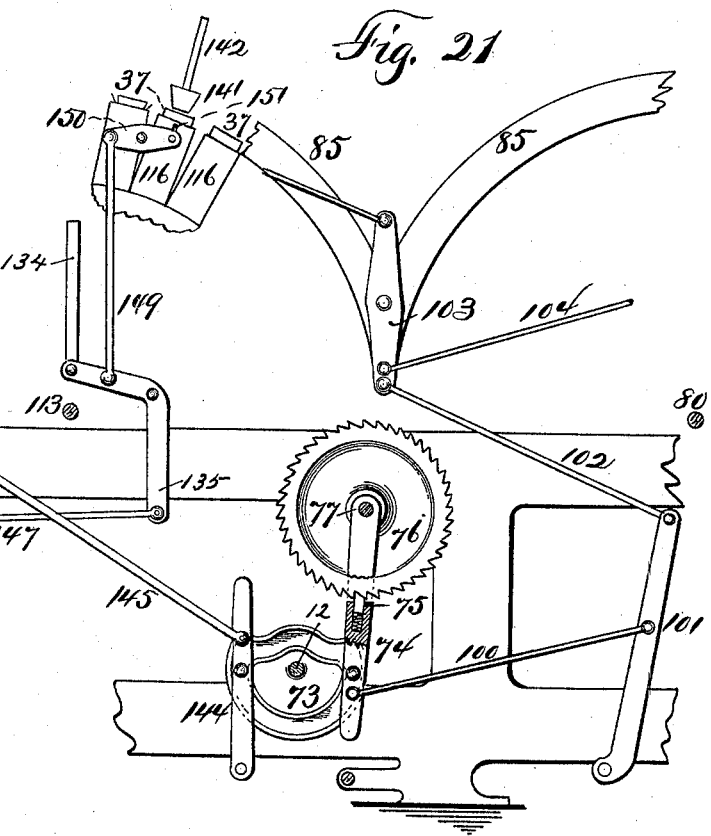

(No Model.) 12 Sheets—Sheet 11.
W. H. BULLOCK.
PACKING MACHINE.
No. 584,850. Patented June 22, 1897.
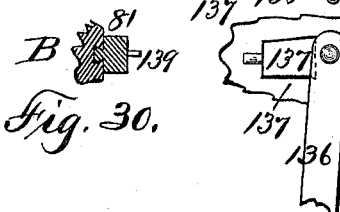
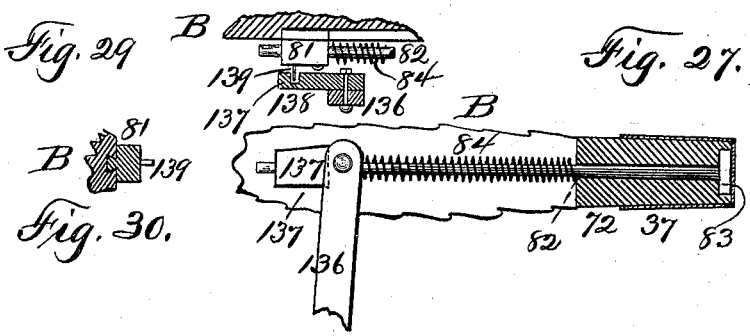
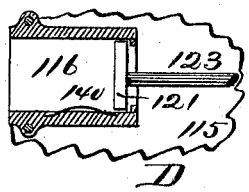
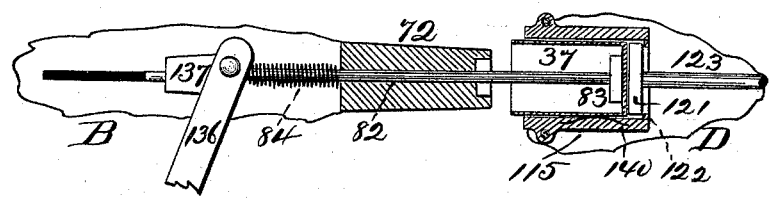
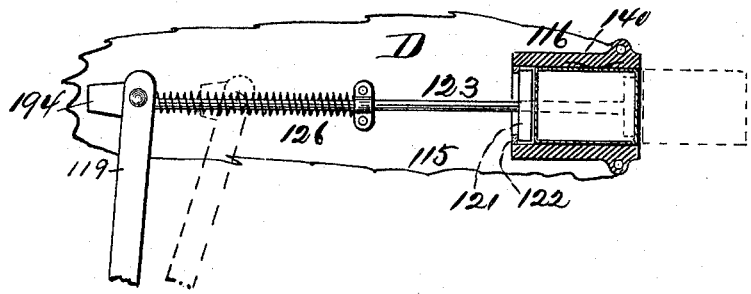
 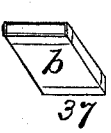 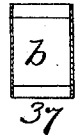 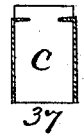
WITNESSES:
Charles W. Morris
Maude E. Cooke
INVENTOR
William H. Bullock
BY
Smith & Denison
his ATTORNEYS.

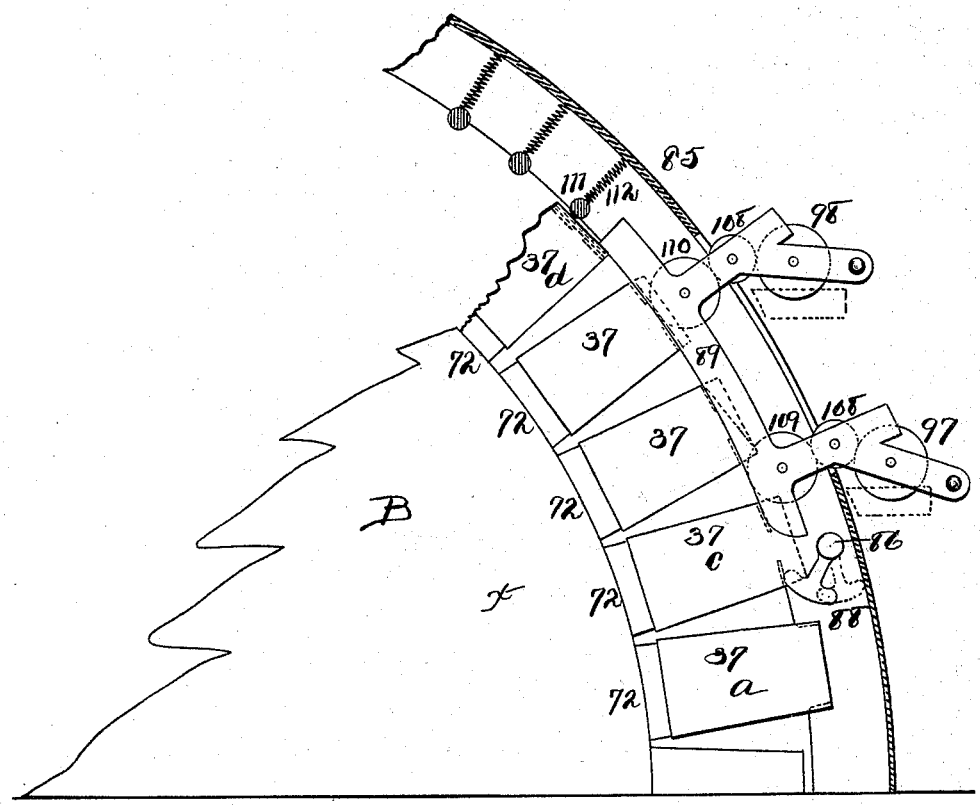

UNITED STATES PATENT OFFICE.

WILLIAM H. BULLOCK, OF OSWEGO, NEW YORK, ASSIGNOR TO THOMSON KINGSFORD AND T. P. KINGSFORD, OF SAME PLACE.

PACKING-MACHINE.

SPECIFICATION forming part of Letters Patent No. 584,850, dated June 22, 1897.

Application filed April 27, 1896. Serial No. 589,222. (No model.)

*To all whom it may concern:*

Be it known that I, WILLIAM H. BULLOCK, of Oswego, in the county of Oswego, in the State of New York, have invented new and useful Improvements in Packing-Machines, of which the following, taken in connection with the accompanying drawings, is a full, clear, and exact description.

My invention relates to machines for packing dry materials into boxes, such as starch and like substances, the boxes being first folded over and secured to create a blank open at both ends and having the corners cut out, and being suitably scored, when necessary, to assist in the folding over of the flaps to close the end, such folding of the bottom, filling, and closing of the top, and delivery of the filled and sealed packages all being done in a single machine, into which the blanks are fed continuously.

My object is to produce a machine of this class embodying an air-suction feed mechanism by which the flattened blanks are fed into a suitable receiving-chamber. Then pressure is applied to one edge of said blank, which opens it into a substantially rectangular form. Then force is applied to one end of the opened blank and it is forced onto a mandrel, such mandrel being one of a series each of which is mounted upon a line radial to the center of a wheel. Then upon this mandrel, by the rotation of this wheel, the open blank is carried through a mechanism for tucking, folding, and gluing down the flaps and thus closing the bottom of the package. Then as the wheel revolves the closed bottom is carried over in contact with spring-pressed holders set in a frame concentric with said wheel, by which the closed-bottom flaps are held until the glue sets. Then, said package having reversed ends, by the half-revolution of said wheel a suitable plunger working through said mandrel transfers said bottom-closed blank into a suitable pocket, one of a series upon lines radial to a wheel. Then by the revolution of this wheel each socket and blank are brought under a reciprocating plunger which spreads the flaps open and apart from each other. Then the wheel carries it under the filler, by which the material has been measured and compacted and from which a charge is forced into the open-top blank, filling it. Then it is carried around and tucking, folding, and gluing mechanisms close and glue the top and complete the package, which is then carried around under a trackway concentric with this wheel in suitable engagement with spring-actuated pressers mounted in said track until when it arrives at a suitable point a plunger expels it from the pocket filled, sealed, and completed, all of said mechanisms having an intermittent action, as the first wheel is stopped, to permit a blank being forced onto a mandrel and to be discharged into a pocket of the second wheel, that wheel being then stopped. At the same stoppage of this second wheel the spreader opens the top of one blank and the filler fills one in advance and the completed package is discharged, while at the same time a flat blank is fed into the opener, then opened, and then fed onto a mandrel. It is constructed as follows, reference being had to the accompanying drawings, in which—

Figure 10:
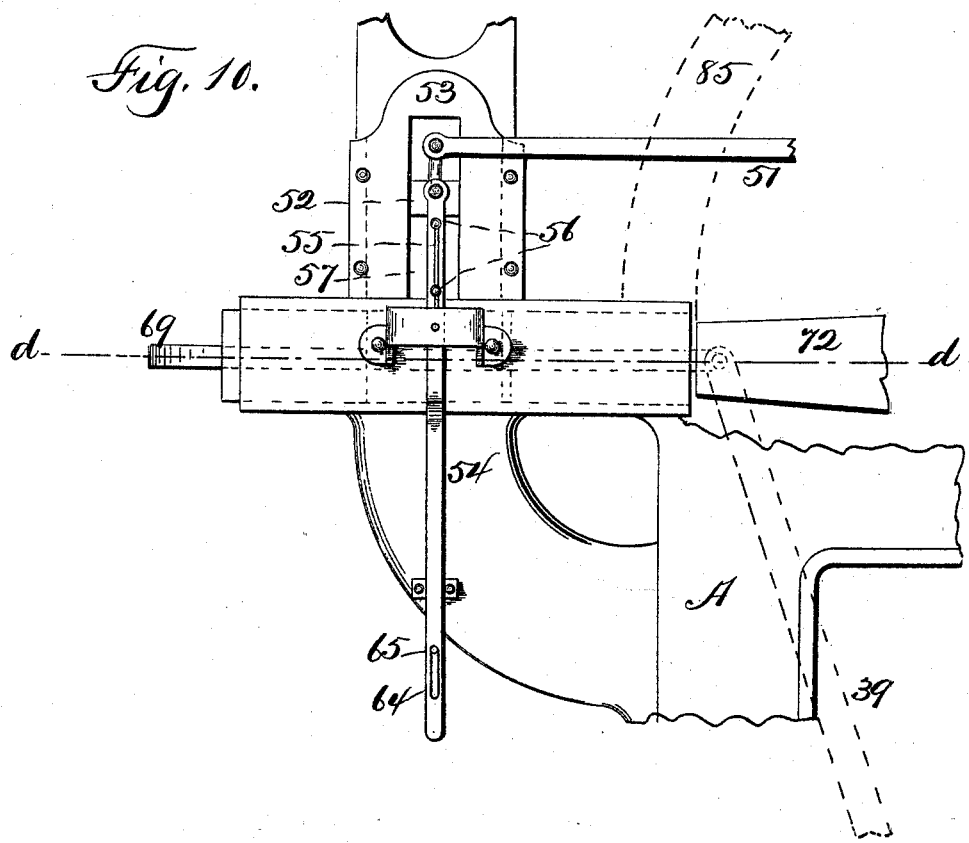
Figure 11:
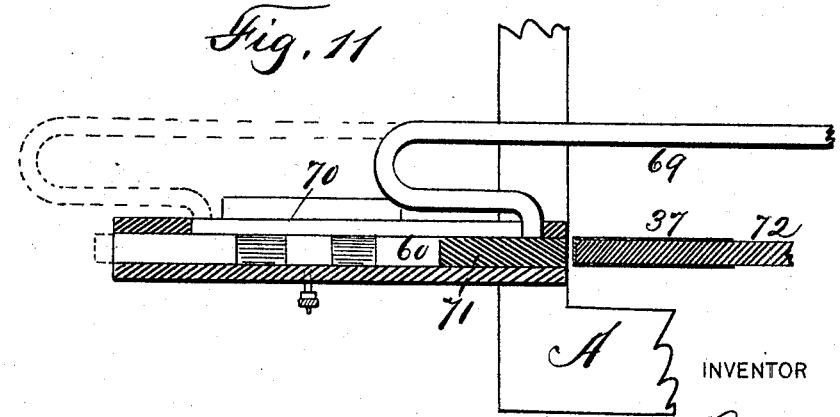

Figure 1 is an elevation of the front of the machine. Fig. 2 is a like view of the rear thereof. Fig. 3 is a vertical section, on an enlarged scale, of the package-blank holder, suction-feed mechanism, tilting table, blank-opener, and discharge mechanism, showing one package-blank ready to be opened and another just falling onto the tilting table. Fig. 4 is a like view of the same parts, showing the suction-feed mechanism retracted, the tilting table tilted, and the discharge mechanism about to discharge an opened blank. Fig. 5 is a sectional detail of the spring-latch which prevents the blank from being raised while being opened. Fig. 6 is an end elevation of the blank-holder, suction-feed, tilting table, and blank opening and discharging mechanisms. Fig. 7 is an enlarged elevation of the fingers which regulate the feed of one blank at a time from the holder. Fig. 8 is a vertical sectional elevation of one of the smooth-faced fingers. Fig. 9 is a like view of one of the rough-faced fingers. Fig. 10 is an end elevation of a part of the machine, showing the mechanism whereby the opened blank is transferred from the chamber to the mandrel. Fig. 11 is a sectional detail of the same on line *d d*, Fig. 11. Fig. 12 is a vertical longitudinal sectional elevation omitting the wheels and showing cam 16 and the levers and connections operated by it to operate the blank-feeding mechanism, the opening, the transferring onto the mandrel, the flap tucking, folding, and gluing, the stirring, the knocking, and other mechanisms. Fig. 13 is a detail of the angle-lever which operates the suction-feed of the blanks from the holder. Fig. 14 is a vertical sectional elevation on substantially the line of the axis of the filling-wheel through said wheel, the pockets thereon, the hopper, and the measuring, packing, and filling mechanisms. Fig. 15 is an enlarged vertical section through the hopper, the measuring and the packing chamber, and showing a charge just pushed down into a blank in one of the pockets. Fig. 16 is a section of the measuring and packing mechanism, showing the material compacted and ready to be discharged into a blank. Fig. 17 is a like view of the same, showing it open ready to receive a charge from the hopper. Fig. 18 is a rear elevation of part of the two wheels and the mechanism for simultaneously and intermittently stopping and releasing them. Fig. 19 is a sectional view of this stop on line $d\ d$, Fig. 18, showing both wheels locked against rotation. Fig. 20 is a like view of the same, showing both unlocked and released. Fig. 21 is an elevation of the driving-ratchet and the cam which operates the glue-rolls and also the package-spreader. Fig. 22 is a detail of the spreader and a pocket and blank therein, showing the flaps on the top of the blank opened and spread. Fig. 23 is a bottom plan of a flap-folder for either end of the blank. Fig. 24 is a section thereof on line $e$, Fig. 23. Fig. 25 is a cross-section on line $f$, Fig. 23. Fig. 26 is a like view on line $g$, Fig. 23. Fig. 27 is a sectional detail of a mandrel, a blank thereon, and the mechanism for transferring it into the opposite pocket. Fig. 28 is a like view of the same parts, showing the blank transferred. Fig. 29 is a detail of the connection of the transfer-plunger to the lever. Fig. 30 is a detail of the mounting of the block to which the transfer-plunger is connected in a groove in the wheel and in which it reciprocates as the plunger is operated. Fig. 31 is a sectional detail of a pocket and the discharging plunger and lever. Fig. 32 shows the package-blank in its different stages of preparation for filling. Fig. 33 is a sectional detail of the cam and the lever for pushing aside the packages as they are discharged filled. Fig. 34 is an elevation of the push-rod and part of its actuating-lever. Fig. 35 is a detail of the main rod leading from the cam-lever and the bell-crank levers connected to it. Fig. 36 is a detail in sectional elevation of a presser-roller and its mounting which engages with the ends of a blank after they are glued and while the glue is setting during the rotation of either wheel. Fig. 37 is an enlarged detail of part of a mandrel-wheel and blanks upon the mandrels, the flap folder and tucker, glue-rolls, and presser-rollers engaging with the folded, tucked, and glued flaps.

A is a suitable frame in or upon which the different mechanisms are mounted, said mechanisms being hereinafter described separately and in their regular sequence.

*Blank-feeding mechanism*, Figs. 1, 2, 3, 4, 5, 6, 7, 8, 9, 12, and 13.—A suitable hopper 2 is erected upon said frame, in which the blanks are placed, being thus flattened, so that their sides are together, or substantially so, their ends being open, the flaps projecting ready to be folded or tucked, the bottom of said hopper having on two sides suitable inwardly-projecting flanges to support said blanks. It is also provided with a suitable opening at the lower end of the front wall through which said blanks are fed. Upon the front spring-fingers 3 4 are suitably mounted, so as to be adapted to be vertically reciprocated. Each consists of a shank 6, set in a head 7, having a slanting face 8, which in the fingers 3 is smoothed and in fingers 4 is transversely roughened, substantially as shown, and all are provided with stop-pins 9, which regulate their downward projection by the springs 10, said springs permitting said fingers to yield vertically as a blank is forced through under them and said corrugations operating to separate the blanks and prevent only one being fed out at a time. A gear 11 on a shaft 12, Fig. 2, is driven by any suitable means, as by a miter-gear 13 on a shaft 14, and a fast and loose pulley 15, driven by a suitable belt from any source of power, to drive the entire machine. Upon this shaft, Fig. 12, a cam 16 is mounted. An upright lever 17, pivoted to the frame at 18, is suitably connected to said cam at 19, so as to be vibrated by its revolution. This actuates a rod 20, an upright lever 21, pivoted at 22 to vibrate it and actuate a rod 23, which is connected to a bell-crank lever 24, which by a link is connected to an upright 25, pivoted at 26, and a link 27, Figs. 3 and 4, connects to a reciprocating cylinder 28, in which is a stationary piston 29 on a stem 30, suitably secured to an arm 31 upon the frame. A tubular nozzle 32 upon said cylinder engages with the lowermost blank in the blank-holder 2, as in Fig. 4, so that said cam mechanism will throw said cylinder to the right, creating a partial vacuum therein and by suction firmly holding said blank upon said nozzle, so that it is shoved or drawn out from under the pile, Fig. 3, and when clear therefrom the stem 33 of the valve 34 strikes a bar 35, mounted on said frame, and this opens the valve and releases the blank from the suction and causes said nozzle to fall upon the tilting table 36, 37 indicating such blank and being used to designate it through all the different operations of the machine leading to the final discharge of the completed package.

*Table-tilting mechanism.*—A rod 38, connected to the top of the lever 17, Fig. 12, vibrates the upright lever 39, pivoted at 40, to reciprocate the rod 41, and through the bell-crank 42, Fig. 12, and upright 43 and link 44, Fig. 6, tilts said table upon its pivot 45.

*Blank-shifting mechanism.*—An upright lever 46, pivoted at 47, engages with a cam 16 and is vibrated thereby, thus actuating a rod 48 to vibrate an upright lever 49, having an arm 50, like unto a bell-crank, which vertically reciprocates a bar 51, which is connected by a link, Fig. 10, to a frame consisting of a push-bar 52, mounted in a vertical way in an upright 53, and a vertical lifter 54, Figs. 3 and 4, which is slotted longitudinally, as at 55, Fig. 10, through which the pins 56 are inserted into the plate 57, and 58 are springs which yieldingly support the top of of said plate, which also forms one side of the chamber 59, which receives the blank 37 when the push-bar 52 is raised and the table 36 tilted to the position shown in Fig. 4. Then when the push-bar 52 is forced down by the bar 51 it pushes the flat blank down into the opening-chamber 60, Figs. 3 and 4, striking an incline in the bottom thereof and assuming the position therein shown in Fig. 3. While being forced down it has sprung back the spring-latch 61, which constitutes the bottom of the chamber 59, and the downward movement of the bar 54 has, through its shoulder 62, engaging with the spring-actuated slide 63, retracted said slide, as in Fig. 3, from its projection into the chamber 60. The latch 61 normally supports the blank as it is discharged from the tilting table ready to enter the chamber 60.

*Blank-opening mechanism.*—The bar 54 is provided with a slot 64, Fig. 10, through which a pin 65 is loosely inserted, which is secured to an arm 66, Figs. 3 and 4, upon a rod 67, having a presser-head 68 inside of the opening-chamber, and in fact constituting the bottom thereof when the bar 54 and push-bar 52 are down, as in Fig. 3. By means of the lost motion in the slot 64 when the bar 54 is raised the slide 63 will be released and projected into this chamber, as in Fig. 4, above the upper edge of the blank therein, before any motion is imparted to the presser-rod and its head 68. Then as said head is raised the blank is opened out from the flat shape at $a$ in Fig. 32 to the rectangular shape at $b$ in said figure.

*Blank-discharging mechanism.*—The operation of the rod 38 by the lever 17 and cam 16, vibrating the upright 39, reciprocates the discharge-bar 69, Figs. 4, 10, 11, and 12, passing through the slot 70 in the wall of said chamber and secured to the head 71, so that said head will push said blank endwise out of said chamber onto a mandrel 72.

*Mandrel-wheel mechanism.*—Upon the shaft 12 a cam 73, Fig. 21, is secured, and an upright 74 suitably engages therewith and is vibrated thereby and through a spring-pawl 75, mounted thereon, rotates the ratchet 76 and the shaft 77, upon which it is secured, and intermittently drives the gear 78 upon the shaft 77, which drives the gear 79 upon the shaft 80, to intermittently drive the mandrel-wheel B, Fig. 2, which consists of a suitable hub and a body secured thereon, consisting of a flat circular disk. Blocks 81 are mounted in radial grooves or ways 28 and 29, Fig. 30, in the body of this wheel, in which rods 82 are secured, which extend outward radially through the mandrels and are provided with heads 83, Figs. 27 and 28, which normally fit into recesses in the outer ends of said mandrels, and 84 is a suitable spring which operates to hold said rod, block, and head in their normal positions, as in Fig. 27.

*Flap tucking and folding mechanism*, Figs. 1, 12, 23, 24, 25, and 26.—Two mechanisms are shown, on the right, Fig. 12, for closing the bottom of the blank and that on the left for closing the top, the only difference between them consisting in the means for operating the tucker, which folds over the flap on the rear edge of the blank. A suitable curved frame 85 is erected upon the main frame concentric with both wheels, in which a rock-shaft 86 is suitably journaled, having one end suitably connected to the bell-crank 87, Fig. 1, the other arm thereof being suitably connected to the lever 51, and 88 is a tucker-cam secured to said rock-shaft, so that when the lever 51 is raised said rock-shaft is rocked and the cam oscillated, so that its upper arm will engage with and fold or tuck the rear flap of the blank over onto the end of the mandrel, and when the movement of the lever 51 reverses said tucker will be retracted and swung out of the way of the blank on the following mandrel. Upon the frame 85 the folder 89 is mounted, having a beveled point 90, which engages with and folds over the front flap; also, having lateral grooves 91 and 92, which receive the side flaps and through which they are guided, one side flap until it engages with the beveled folder 93, which turns over this side flap, and the other until it engages with and is turned in by the oppositely-beveled folder 94.

*Gluing mechanism*, Figs. 1, 2, 12, and 21.— Upon the frame 85 suitable glue-pans are mounted, and in them rollers 97 98 are suitably journaled, their shafts being provided with ratchets 99. The oscillation of the lever 74, Fig. 21, by the cam 73 actuates a rod 100 to vibrate an upright 101 to actuate a rod 102 and vibrate the walking-beam 103, which actuates the rod 104 to rock the bell-crank 105, Fig. 1, through the link 106, to reciprocate the rack-bar 107, which engages with said ratchets to rotate them and drive said rollers 97 98 in the glue-pans. By means of idlers 108, Fig. 12, the glue is transferred to the gluing-rollers 109 110, which project through slots in the folder, Figs. 23 and 24. The reciprocation of the rack-bars 107 rotates the ratchets first in one direction and then in the other, and this transmits the same rotary reciprocation to the rollers 97 and 98, idlers 108, and glue-rollers 109 and 110. When the edge flaps have been tucked in, as at Fig. 32 and as before described, the blank is carried through under the roller 109, which glues these flaps, and when the first side flap is folded in then the blank is carried under the roller 110, which glues that flap, and then the other side flap is folded over onto this glued flap and all of said flaps are glued together, and the bottom of the blank is thus closed, as at d, Fig. 32.

*Bottom-holding mechanism*, Figs. 12 and 36.—In the frame 85 rollers 111 are suitably journaled and are yielding through the springs 112, and as soon as the bottom is folded the revolution of the mandrel-wheel carries it around under the presser-rollers, and these are spring-pressed to hold said flaps down while the glue is setting and also by their rolling action compacting and squeezing said flaps down tightly together.

*Filling-wheel*, Figs. 1, 2, 14, 15, 27, and 28.—The continued rotation of the mandrel-wheel brings the blank into position for its transfer to the filling-wheel D, which is secured upon a shaft or axle 113, upon which a gear 114 is also secured, meshing with and driven by the gear 78, Fig. 2, in the same direction as the mandrel-wheel and with the same intermittent action, as the gears 79 and 114 are of equal size. This wheel comprises a suitable body 115 and pockets 116 for receiving the closed-bottom blanks, each pocket being secured to a support 117, having an outward flange 118 and a rearward lug 119 through a radial slot 120 in said body, each pocket having a plunger 121, forming its bottom, engaging with the retaining lugs or flanges 122 and provided with a stem 123 through the flange 118 and having a block 124 secured thereto and provided with a pin 125 and a spring 126, normally exerting its force to hold said plunger in the bottom of said pocket. A spring 127 engages with the lug 119 to support the pocket in its normal position when it is below the center of said wheel.

At a fixed and predetermined point in the rotation of this wheel the lug 119 engages with or enters a groove 128 in a slide 129, mounted in suitable ways 130 upon the standard 131, which carries the packing and feed-hopper mechanism, and by means of a pin 132, the slot 133 in said standard, and the rod 134 connected thereto and connected to the bell-crank 135 each of said pockets is raised, so that the mouth of the discharge-spout *m* enters the top of the blank while the plunger is feeding a charge into it, said bell-crank being actuated by a mechanism hereinafter described.

*Blank-transferring mechanism*, Figs. 1, 12, 27, and 28.—Upon the rock-shaft 22, to which the upright 21 is secured and by which it is rocked, the transfer-lever 136 is secured, having a lateral arm 137 pivoted thereon, provided with a transverse groove 138, which receives the stud 139 of each block 81 successively as the wheel revolves. Then by the swing to the right of the lever 136 the block 81 is shifted to about the position shown in Fig. 28, and the plunger-head 83 has transferred the blank from the mandrel into the pocket, where it is retained against accidental loss by means of a friction-spring 140.

*Top-spreading mechanism*, Figs. 2, 21, and 22.—The continued rotation of the filling-wheel brings each package around to the spreader 141, which has flaring sides and ends, substantially as shown, and is mounted upon a rod 142, which is adapted to be reciprocated in a guide 143 by means of the upright 144, engaging with the cam 73 and actuating the rod 145, walking-beam 146, rod 147, bell-crank 135, rod 149, walking-beam 150, rod 151, and an arm thereon, which is secured to the rod 142, will force the spreader down into the top of each blank and spread the side and edge flaps to flare outwardly, as shown in Figs. 21 and 22, ready to receive a charge of the material being packed.

*Packing mechanism*, Figs. 12, 14, 15, 16, and 17.—A suitable hopper 152 is erected upon the main frame and provided with a stirrer 153 upon a suitably-journaled shaft 154, having a ratchet-pinion 155 secured thereon. The cam 16 vibrates the upright 46, Fig. 12, actuating the rod 156 to oscillate the T-lever 157 and vertically reciprocate the rod 158 and the rack 159 thereon, engaging with the ratchet 155 to rotate the stirrer and agitate and break and loosen up the contents of the hopper. The bell-crank 135 being connected to the rod 134, Fig. 21, also operates to raise and lower the pockets, as aforesaid. Below the hopper a box 160 is suitably mounted, in which a plunger 161 is mounted upon a rod 162, connected by a link 163 to the lever 164, pivoted at 165, and actuated to reciprocate said plunger like a piston to pack the material discharged from the hopper by the following mechanism. Another cam 166 is mounted upon the shaft 12 to vibrate a lever 167, rod 168, and bell-crank 169, connected by a link 170 to the lower end of the packing-lever 164, and whereby said packing-piston is reciprocated to receive a charge and pack it and permit it to be discharged into a blank. The plunger 161 is vertically mortised to receive a yielding side 171 of said mortise, which comprises a flat plate transverse to said mortise and side pieces in contact with the longitudinal walls of said mortise. Suitable guide-rods 172 are inserted through the end 173 of the box 160 and the end of the plunger and secured to said yielding side. Suitable springs 174 are provided having their extremities in engagement with the end of the plunger and with said yielding side, whereby said side is retracted to its normal position. Jam-nuts upon said rods 172 limit the movement of said side within the mortise under the action of the springs 174, and when said limit is reached enable the plunger to thereafter carry said side along with it. Heads 176 upon the rods 172 regulate or limit the retraction of said side. A part of said mortise constitutes the packing-chamber 177, of which 171 constitutes the yielding side. This chamber is filled from the hopper, the springs 174 being then compressed and the side 171 being held by the heads 176. Then as the plunger is forced forward the material is compacted between it and the side 171, said side remaining substantially stationary, the spring expanding until the end of the plunger encounters the jam-nut. This directly connects this side to the plunger, so that thereafter the movement of the plunger carries with it the compacted charge and yielding side to the limit of the stroke. This brings the parts substantially into the position shown in Figs. 15 and 16, the plunger then closing the throat of the hopper, having also cut off and thereby measured a charge of the material. Then after the charge has been expelled, as hereinafter described, the movement of the plunger is reversed. This first releases the springs to force the yielding side back until the heads 176 encounter the end 173, and thereafter the movement of the plunger compresses the springs and also opens the throat of the hopper, so that another charge may fill the packing-chamber, the parts being then in the position shown in Fig. 17. In Fig. 16 the charge is directly under the filling-plunger 183 and over the discharge-chute, as is shown by Fig. 15.

*Charge feeding or filling mechanism*, Figs. 1, 12, 14, and 15.—The upright 17 actuates the rod 180 and the bell-crank 181 and vertically reciprocates the rod 182, which is suitably connected to the filling-plunger 183, Fig. 1, whereby a charge 184 is fed into the flaring-mouthed blank contained in a pocket raised as aforesaid.

*Package-closing mechanism*, Figs. 1, 2, 23, and 24.—This tucking, folding, and gluing mechanism is the same as that before described for closing the bottom of a blank, except in the means for operating the rear-flap tucker and rotating the glue-rollers. This tucker is operated by means of a rod 185, Fig. 12, connecting the left-hand arm of the T-lever 157 to an arm 186 upon the rock-shaft 86, to which the tucker 88 is secured, and the glue-rollers are rotated by means of a rod 187, connected to the walking-beam 103, Fig. 2, and connected to a swinging support 188 and by a link 189 to a rack-bar 190. As soon as the top flaps are folded and glued this end of the package comes into engagement with and under the pressure of the presser-rolls 111 on the left of Fig. 12, so that the glue is set by the time the package reaches the point of discharge.

*Package-discharging mechanism.*—This is like unto the mechanism for shifting the blanks from the mandrels into the pockets in that the wheel is provided with plungers having springs to retract them and with blocks 124, provided with pins 125, said blocks being like unto the blocks 81 and their pins, which are successively engaged by the discharging-lever as the wheel revolves, and each time the wheels stop and are locked a package is discharged from a pocket, while simultaneously therewith a blank is transferred from a mandrel to the pocket in alinement with it. The cam 16 actuates the rod 20 as a part of the suction-feed mechanism and thus actuates the rod 191, which is suitably connected to said rod 20, thus vibrating the upright 192, secured to the shaft 193, and also vibrating the arm 119, secured to said shaft and provided with a lateral 194, and this reciprocates the plunger 121 to eject the completed package from its pocket and to return said plunger to its position in the bottom of its pocket, the ejected package then lying on the table, but in line with the movement of the following package.

*Removing mechanism*, Figs. 34 and 35.— A link 195 connects the bell-crank 169 to the bell-crank 196, and the link 197 connects this to the swinging lever 198, having a head 199, by which the swing of said lever pushes each of the packages aside successively out of the way of the next one.

*Wheel-locking mechanism*, Figs. 18, 19, and 20.—Another cam 200, secured upon the shaft 12, actuates the upright 201, the rod 202, the walking-beam 203, and the pitman-rod 204, connected to the slide or double bolt 205, provided 206 on its ends with tapered heads 207, complementary to the recesses between the lugs 208, secured upon said wheels, on the one in alinement with the mandrels and on the other with the pockets. This locking of wheels insures the proper presentation of each mandrel to receive an opened blank, the proper presentation and alinement of each mandrel to a pocket, the proper engagement and action of the transferring mechanism, the proper presentation of each pocket to the spreader, the proper presentation of each blank to receive its filling charge, and the proper presenting of each filled package for discharge from its pocket.

*Knocking mechanism*, Fig. 2.—A lever 209 is pivoted at 210, so that its lower end will engage with each of the lugs 208 as the filling-wheel revolves, each time swinging the hammer 212 on its upper end away from the hopper 152, and the spring 213 will retract it to strike a blow against the side of the hopper to dislodge any material sticking to its sides and shake or jar the contents of the hopper, and thus aid its feeding down to the agitator.

*Waste-pipe*, Figs. 1 and 14.—With some finely-ground or pulverized materials more or less of it will fly from the packing-chamber, and to catch that a waste-pipe 214 is provided. It is also provided with an opening 215 in one side and with inclined shelves 216 and 217, which conduct the material dropping from the filling through said opening into said pipe and protect the wheel-shaft and other working parts from such material.

*Heating mechanism*, Fig. 1.—A steam-pipe 218, provided with laterals 219 220, operates to conduct steam into the glue-pans to keep the glue hot and ready for use.

*Starting and stopping*, Figs. 1 and 2.—A hand-lever 221 is suitably connected to an ordinary belt-shifting mechanism by which the belt can be shifted from the fast to the loose pulley 15 for stopping and, vice versa, for starting, and as this is a well-known mechanism it is not specifically described; or in place of a belt-shifter an ordinary clutch-shifter can be used, actuated by said lever.

What I claim as my invention, and desire to secure by Letters Patent, is—

1. The combination with a hopper for holding blanks, of a stationary piston, a cylinder upon said piston normally in loose engagement with the lowest blank, and means to reciprocate said cylinder and create a suction whereby said blank is fed out of said hopper by the forward movement of said cylinder.

2. The combination with a hopper for holding blanks, of a stationary piston, a cylinder upon said piston normally in loose engagement with the lowest blank, and means to reciprocate said cylinder and create a suction whereby said blank is fed out of said hopper, by the forward movement of said cylinder, and spring-fingers with which said blanks engage, and by which the lower one is separated from the others.

3. The combination with a blank-holding hopper, a stationary piston, a reciprocating cylinder traversing upon said piston, and normally in loose contact with the lowest blank, but adapted to grip it through the suction created by the forward movement thereof, and to feed it out of said hopper, spring-fingers to separate the lowest blank from the others, and a tilting table receiving said blank when so fed out of said hopper.

4. The combination with a blank-holding hopper, and means to feed them therefrom singly, of a blank-receiving chamber normally open on one side, of an inclined table having one end hinged adjacent to said open side, and means to tilt said table, deposit a blank in said chamber and close said open side by said table.

5. The combination with a blank-holding hopper, and means to separately feed blanks therefrom, a tilting table receiving each blank, an upper chamber receiving each blank from the tilted table, and an opening-chamber receiving each blank from the upper chamber, and a plunger therein adapted to be reciprocated to open said blanks from a flattened to a rectangular form.

6. The combination with a hopper for holding flattened blanks, and means to separately feed them therefrom, a tilting table receiving each blank as it is so fed, an upper chamber receiving each blank from the tilted table, an opening-chamber below it, a reciprocating plunger feeding each blank into said opening-chamber, and means to apply force to the lower edge of said flat blank to open it out into rectangular form.

7. The combination with a blank-holding hopper of a stationary piston, a cylinder normally loosely engaging with the lowest blank, and means to reciprocate said cylinder upon said piston, and by its forward movement create a suction to grip said blank and feed it out of said hopper, and a valve in said cylinder opened at the limit of its forward movement to release said blank.

8. In a package-machine, an opening-chamber receiving the flattened blanks for packages, and having a fixed inclined bottom to tilt said blank when it enters it, and a plunger adapted to be raised to squeeze said blank and open it out into rectangular form.

9. In a package-machine, the combination with an opening-chamber receiving the flattened blanks and having a fixed incline to tilt each blank as it enters it, and provided with a vertically-reciprocated bottom to open said blanks out into rectangular form, of a reciprocating plunger engaging with the opened blank to eject it from said chamber.

10. The combination with a tilting table, a chamber receiving flat blanks for packages therefrom, an opening-chamber receiving them from it, a vertically-reciprocating plunger to force said blanks into the opening-chamber, and a plunger in this chamber connected to the other plunger whereby said opening-plunger opens out said blanks into rectangular form.

11. The combination with a primary chamber receiving the flat blanks, a blank-supporting latch therein, and the opening-chamber below it, of a vertically-reciprocated plunger to force said blank down past said latch, and a head in the opening-chamber adapted to be raised to open said blank when the plunger is retracted.

12. A rotating cam in combination with a stationary piston, a cylinder mounted thereon, a vibrating lever actuated by said cam and connected to and whereby said cylinder is reciprocated upon said piston by each revolution of said cam, and a blank-holding hopper from the bottom of which a blank is fed by each forward movement of said cylinder and its direct downward suction upon said blank.

13. In a package-machine, a mandrel-wheel comprising a suitable axle, a body mounted thereon, and mandrels secured in longitudinal radial alinement upon said body, and projecting therefrom, in combination with a chamber in which the flat blanks are opened, and a blank-feeding mechanism whereby the opened blanks are fed onto said mandrels successively as said wheel is revolved.

14. In a package-machine, a mandrel-wheel comprising an axle, a body mounted thereon, mandrels secured upon said body and projecting beyond it in radial alinement, a reciprocating discharge-bar feeding the blanks onto the mandrels successively, and plungers in said mandrels mounted upon rods radial to said body and provided with springs which maintain said plungers normally within said mandrels, and a single-blank-discharging mechanism with which said rods successively engage as the wheel revolves.

15. In a package-machine, a mandrel-wheel comprising an axle, a body mounted thereon and provided with radial ways, blank-holding mandrels secured upon said body and projecting beyond it in alinement with said ways, blocks in said ways, rods secured to said blocks, plunger-heads mounted on said rods, and normally within said mandrels, and means to hold said heads normally therein, and a blank-discharging mechanism with which said rods successively engage as the wheel revolves.

16. In a package-machine, the combination with a mandrel-wheel and mandrels mounted thereon in radial alinement to receive the opened blanks, of a stationary folder mounted and curved concentric with said wheel and closely adjacent to the outer ends of said mandrels, and comprising a body provided with an inclined front end to hold in the flap upon the front edge of a blank, a longitudinal groove receiving and holding a side flap in alinement with the body of the blank and merging into an incline to fold it in, a like parallel groove of greater length merging into an oppositely-arranged incline to receive and then to fold in the other side flap after the first side has been folded in, and an oscillating folder to fold in the rear edge flap before the side flaps are folded in.

17. In a package-machine, the combination of the following elements, a beveled point to fold in the front edge flap of a package-blank, a glue-roller gluing said flap, an oscillating folder to fold in the rear edge flap to be glued by said roller, an incline folding in one side flap, a roller to glue it, and press it onto said flaps, and another incline to fold in the front side flap onto the folded-in and glued side flap, and means to carry said blank through said folding and gluing mechanism.

18. In a package-machine, a flap-holder comprising a body having an inclined front end to fold in an edge flap, longitudinal grooves of unequal length receiving and holding the side flaps in alinement with the body of the blank and respectively merging into separate inclines to first fold in one side flap and thereafter to fold in the other side flap, in combination with a cam-faced oscillating tucker to fold in the rear edge flap of said blank.

19. In a package-machine, a blank-closer, comprising a body provided with a point to fold in one edge flap, a groove on one side to receive and guide one side flap to an incline whereby it is folded over, and a groove on the other side to receive and guide the other side flap to an incline to fold it over onto the other side flap, and intermediate glue-rolls whereby the folded edge flaps are glued and the first folded-in side flap is glued so that all of said end flaps are glued together.

20. In a package-machine, a mandrel-wheel provided with radial dovetailing-lugs at spaced intervals, and a filling-wheel provided with radial dovetailing-lugs spaced apart and set in the opposite way to those upon the mandrel-wheel, in combination with a sliding bolt having dovetailing-heads complementary to the spaces between the lugs of the respective wheels, and means to reciprocate said bolt to bring said heads into or out of said spaces and lock or release both wheels.

21. In a package-machine, a wheel, blank-holding mandrels in radial alinement thereon, and a reciprocating plunger in each mandrel, in combination with a wheel, blank-receiving pockets thereon in radial alinement, and means to reciprocate said plungers successively to transfer a blank from each mandrel successively into said pockets successively.

22. In a package-machine, a wheel, blank-holding mandrels in radial alinement thereon, a reciprocating plunger in each mandrel, and a spring exterior to each mandrel, supporting each plunger in its normal position in each mandrel, and means to project said plungers successively each being returned to its normal position by its spring.

23. In a package-machine, a wheel comprising a body, mandrels for blanks or packages secured in radial lines thereon, reciprocating plungers in them also in radial lines, springs operative to hold said plungers in their normal positions in said holders, blocks connected to said plungers and normally disengaged from a plunger-operating lever, and a plunger-operating lever brought into engagement with said blocks successively by the rotation of said wheel and operative to actuate said plungers successively to remove said blanks from said holders.

24. In a package-machine, a wheel comprising a body, blank-holding mandrels secured thereon in radial lines, reciprocating plungers in said mandrels normally out of engagement with a transfer-lever, a transfer-lever engaging said plungers successively as the wheel is revolved, and means to operate said lever, in combination with a filling-wheel having pockets secured thereon in radial lines, and successively brought into alinement with said mandrels to receive the blank from the mandrel in alinement when said lever is operated.

25. In a package-machine, a chamber, a reciprocating plunger therein provided with a mortise, a U-shaped slide therein constituting one side of the charge-receiving chamber in said plunger, whereby said chamber is varied in size by the reciprocation of said plunger to compact the charge in said chamber.

26. In a package-machine, a chamber, a reciprocating plunger therein provided with a mortise, and a yielding partition in said mortise creating a charge-packing chamber therein, whereby the material fed into said packing-chamber is compacted and shifted out of its normal position when said plunger is operated.

27. In a package-machine, a hopper for holding the material to be packed, a casing below it and connected to it, a reciprocating plunger therein provided with a mortise, and a yielding partition in said mortise creating a packing-chamber in said plunger, whereby the charge of material in it is measured, cut off, compacted and shifted out of alinement with said hopper.

28. In a package-machine, a hopper for holding material to be packed, a casing below and connected to it, a reciprocating plunger therein provided with a charge receiving and packing chamber, a yielding partition constituting one side of said chamber, and means whereby when said plunger is operated said chamber is reduced in size, and the material compacted to a fixed degree before said partition yields to permit the charge being shifted out of alinement with said hopper.

29. In a package-machine, a wheel, and pockets mounted thereon upon radial lines, in combination with a reciprocating lever adapted to engage with said pockets successively as the wheel is revolved, and whereby each pocket is shifted outwardly and returned to its normal position.

30. In a package-machine, the combination with a hopper, a packer compacting the material, and a reciprocating plunger to discharge each charge of material, of a wheel, blank-holding pockets mounted thereon upon radial lines, and means to reciprocate said pockets successively to receive a charge, and to retract them to their normal position.

31. In a package-machine, a hopper, a supporting-standard, and a packing-chamber under said hopper in which the material fed from it is compacted, and a reciprocating plunger to expel each compacted charge, in combination with a wheel, blank-receiving pockets mounted thereon in radial lines, a slide upon said standard with which said pockets engage as said wheel revolves, and means to reciprocate said slide to advance said pocket to receive a charge and to return it to its normal position thereafter.

32. In a package-machine, a holder for package-blanks, a chamber receiving them as they are fed therefrom and having an inclined bottom whereby each one assumes a position inclined diagonally across said chamber, and a reciprocating plunger actuated to engage with an edge of the inclined blank and open it out into rectangular form.

33. In a package-machine, a wheel and radial blank-holders thereon holding the open end blanks, in combination with a cam, a rocking cam-faced tucker and intermediate connections whereby one edge flap is folded inwardly, a stationary folder provided with an incline to fold in the other edge flap, and having two sequential inclines whereby one side flap is folded over to be glued, and then the other one is folded over onto the said glued flap, and means to apply glue thereto.

34. In a package-machine, a wheel and mandrels or pockets mounted thereon in radial lines and holding the blanks, in combination with a cam, a reciprocating rack-bar connected thereto by intermediate connections, and glue-rolls provided with ratchets upon their arbors with which said rack-bar engages and by which they are driven intermittently first one way and then the other to distribute glue upon the flaps of said blanks after being folded in.

35. In a package-machine, a wheel and blank-holders mounted thereon on radial lines and holding the open-end blanks, in combination with a cam, an oscillating tucker driven by it through the intermediate connections to fold one flap, a stationary folder provided with inclines to successively fold the other flaps, and glue-rolls engaging with said folded flaps, ratchets upon their shafts, a rack-bar engaging with them, a cam and intermediate connections whereby said rack-bar is reciprocated and said glue-rolls driven to glue the flaps of said blanks.

36. In a package-machine, two wheels mounted upon parallel shafts but not overlapping each other, blank-receiving mandrels mounted in radial lines on one, pockets mounted in radial lines on the other, and a reciprocating plunger in each mandrel, in combination with an oscillating lever, a cam and intermediate connections whereby said lever actuates each plunger to transfer the blank upon its mandrel to a pocket, as said mandrels and pockets are brought into alinement by the rotation of said wheels.

37. In a package-machine, a wheel, blank-receiving pockets mounted thereon in radial lines, in combination with a cam, a reciprocating push-bar connected thereto by intermediate connections whereby it is actuated to shift each pocket as it reaches a predetermined point by the rotation of said wheel.

38. In a package-machine, a hopper, a casing below it and interiorly connected to it, a reciprocating plunger in said casing provided with a mortise to receive a charge of material from the hopper, and measure it by cutting it off from said hopper, and a yielding wall within said plunger against which the charge is compacted, in combination with a cam, a vibrating lever and intermediate connections whereby said lever reciprocates said plunger.

39. In a package-machine, a hopper, a casing below it, a reciprocating plunger having a packing-chamber in it provided with a yielding wall on one side and within the plunger, in combination with a cam, and a vibratory lever connected to said plunger and by intermediate connections to said cam, whereby said plunger is reciprocated to cut off a charge from said hopper and compact it.

40. In a package-machine, a hopper, a casing below it provided with a discharge-spout, a reciprocating plunger mounted in said casing and provided with a mortise receiving and measuring a charge from said hopper, a yielding wall in said mortise against which said charge is compacted and shifted into alinement with said spout, and a reciprocating expelling-plunger in alinement with said spout, in combination with a rotating wheel and pockets thereon in radial lines which are successively brought into alinement with said spout to receive a compacted charge from said plunger.

41. In a package-machine, a mandrel-wheel, blank-receiving mandrels mounted thereon upon radial lines, and a filling-wheel and pockets mounted thereon in radial lines, said wheels being mounted upon parallel shafts and carrying said mandrels and pockets in the same plane and means to rotate said wheels to bring the respective mandrels and pockets into alinement.

42. In a package-machine, a compacting-plunger constituting three sides of a packing-chamber, in combination with a yielding wall constituting the other side thereof, and means to reciprocate said plunger to vary the space between it and the yielding wall.

43. In a package-machine, a plunger constituting three sides of a packing-chamber, in combination with a yielding wall constituting the other side thereof and springs behind it to support it within said plunger and opposite to the face thereof, and means to reciprocate said plunger.

44. In a package-machine, a reciprocating compacting-plunger inclosing three sides of a packing-chamber, and a yielding wall constituting the fourth side, combined with a hopper to feed material into said chamber and a plunger to eject it therefrom into a chute out of alinement with said hopper.

45. In a package-machine, a casing, a reciprocating plunger therein provided with a packing-chamber having three rigid sides and one yielding side whereby the forward movement of said plunger first reduces the size of said chamber and compacts the material until the resistance of the yielding side is overcome and then its further movement carries said compacted material and yielding side along together to a predetermined point of discharge.

46. In a package-machine, a casing, a reciprocating plunger therein provided with a packing-chamber having three rigid sides and one yielding side whereby the forward movement of said plunger first reduces the size of said chamber and compacts the material until the resistance of the yielding side is overcome and then its further movement carries said compacted material and yielding side along together to a predetermined point of discharge, combined with another plunger to eject said material into a previously-prepared package-blank.

In witness whereof I have hereunto set my hand this 20th day of April, 1896.

WILLIAM H. BULLOCK.

In presence of—
H. L. HOWE,
WM. V. BURR.